United States Patent
Hanslmeier et al.

(10) Patent No.: US 12,414,662 B2
(45) Date of Patent: Sep. 16, 2025

(54) FILTER CASSETTE

(71) Applicant: Hilti Aktiengesellschaft, Schaan (LI)

(72) Inventors: Xaver Hanslmeier, Mauerstetten (DE); Oliver Ohlendorf, Mauerstetten (DE); Roman Podhorny, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 441 days.

(21) Appl. No.: 16/771,207

(22) PCT Filed: Nov. 19, 2018

(86) PCT No.: PCT/EP2018/081698
§ 371 (c)(1),
(2) Date: Jun. 9, 2020

(87) PCT Pub. No.: WO2019/115157
PCT Pub. Date: Jun. 20, 2019

(65) Prior Publication Data
US 2020/0367712 A1    Nov. 26, 2020

(30) Foreign Application Priority Data
Dec. 15, 2017 (EP) .................................... 17207585

(51) Int. Cl.
*A47L 9/12* (2006.01)
*B01D 46/00* (2022.01)

(52) U.S. Cl.
CPC .......... *A47L 9/122* (2013.01); *B01D 46/0005* (2013.01)

(58) Field of Classification Search
CPC .......... A47L 9/122; A47L 9/102; A47L 9/104; A47L 9/106; A47L 9/12; A47L 9/10;
(Continued)

(56) References Cited

U.S. PATENT DOCUMENTS

| 6,536,075 B1 * | 3/2003 | Bonnet | A47L 5/24 15/344 |
| 7,314,558 B1 * | 1/2008 | Jaroszczyk | B01D 46/0067 210/487 |

(Continued)

FOREIGN PATENT DOCUMENTS

| CH | 701532 A2 | 1/2011 |
| CN | 201123780 Y | 10/2008 |

(Continued)

OTHER PUBLICATIONS

International Search Report of PCT/EP2018/081698, dated Feb. 13, 2019.

*Primary Examiner* — David S Posigian
*Assistant Examiner* — Michael A Gump
(74) *Attorney, Agent, or Firm* — Davidson Kappel LLC

(57) ABSTRACT

A filter cassette for a vacuum cleaner appliance positionable in the vacuum cleaner appliance in an airflow drawn in by the vacuum cleaner appliance, wherein the filter cassette contains substantially a lateral surface, an upper opening, and a lower opening, such that the drawn-in airflow, in order to filter out dirt particles, can flow into the filter cassette through the lower opening and out of the filter cassette through the upper opening. A first sealing element extends in a first plane and the a second sealing element extends in a second plane, and wherein the first and second planes are arranged at an acute angle to one another, such that the second sealing element is oriented substantially horizontally when the filter cassette is positioned in a filter cassette receptacle accessible from outside the vacuum cleaner appliance. A vacuum cleaner appliance having a filter cassette receptacle for receiving a filter cassette. The filter cassette receptacle extends substantially in a center plane that is positioned at an acute angle to a parting plane.

13 Claims, 4 Drawing Sheets

(58) Field of Classification Search
CPC ............ B01D 46/0005; B01D 46/0006; B01D 46/0097; B01D 46/10; B01D 46/4227; B01D 2265/024; B01D 2271/00; B01D 2271/02; B01D 2271/027; B01D 2279/55
USPC .......................................................... 15/347
See application file for complete search history.

(56) References Cited

U.S. PATENT DOCUMENTS

| | | | |
|---|---|---|---|
| 8,668,756 | B2 | 3/2014 | Bannister |
| 9,127,625 | B2 | 9/2015 | Kaiser et al. |
| 2006/0272509 | A1 | 12/2006 | Toyo et al. |
| 2008/0115315 | A1* | 5/2008 | White ..................... A47L 9/122 15/347 |
| 2014/0034565 | A1 | 2/2014 | Loken et al. |
| 2016/0230716 | A1* | 8/2016 | Finn ...................... B01D 50/20 |
| 2017/0245712 | A1* | 8/2017 | Son ........................... A47L 9/28 |
| 2019/0313872 | A1* | 10/2019 | Ward .................... A47L 9/2868 |
| 2020/0061512 | A1* | 2/2020 | Holzmann ............. B01D 46/10 |

FOREIGN PATENT DOCUMENTS

| | | |
|---|---|---|
| CN | 103038491 A | 4/2013 |
| CN | 104024622 A | 9/2014 |
| CN | 205697542 U | 11/2016 |
| CN | 107007208 A | 8/2017 |
| EP | 1922970 A2 | 5/2008 |
| EP | 2281497 A2 | 2/2011 |
| JP | S5644644 U | 4/1981 |
| JP | H04118125 U | 10/1992 |
| JP | H11132117 A | 5/1999 |
| JP | 2001329921 A | 11/2001 |
| JP | 2004180760 A | 7/2004 |
| WO | WO 2016130450 A1 | 8/2016 |

* cited by examiner

FILTER CASSETTE

The present invention relates to a filter cassette for a vacuum cleaner appliance, wherein the filter cassette is positionable in the vacuum cleaner appliance such that the filter cassette is positionable in an airflow drawn in by the vacuum cleaner appliance, wherein the filter cassette contains substantially a lateral surface, an upper opening, and a lower opening, such that the drawn-in airflow, in order to filter out dirt particles, can flow into the filter cassette through the lower opening and out of the filter cassette through the upper opening.

Furthermore, the invention relates to a vacuum cleaner appliance having a filter cassette receptacle for receiving a filter cassette.

BACKGROUND

Filter cassettes that can be received in a vacuum cleaner appliance, in particular in a vacuum cleaner, are very widely known from the prior art. Such filter cassettes usually contain a rectangular frame, which holds a filter element. The filter element serves to filter dirt particles out of an airflow that is drawn in by the vacuum cleaner appliance.

The filter cassettes that are known from the prior art are usually arranged between a collection container and a suction head of the vacuum cleaner appliance. The collection container serves to collect dirt particles that are filtered out of the drawn-in airflow, and a suction head serves to generate the drawn-in airflow, with which the dirt particles are picked up.

In order to arrange the filter cassette at the intended position in the vacuum cleaner appliance and between the collection container and the suction head, the suction head has to be separated from the collection tank beforehand. Subsequently, the filter cassette is positioned in a receiving device for the filter cassette. The filter cassettes that are known from the prior art contain a sealing element that seals the filter cassette off from the receiving device in an airtight manner when the filter cassette is located in the receiving device.

SUMMARY OF THE INVENTION

The prior art makes the fitting of the filter cassette in the vacuum cleaner appliance and the replacement of the filter cassette complicated, time-consuming and difficult. Furthermore, the filter cassette and in particular the sealing element are not always reliably positioned correctly.

An object of the present invention is to provide a filter cassette for a vacuum cleaner appliance and a vacuum cleaner appliance having a filter cassette receptacle for receiving a filter cassette, with which the above-described problem can be solved and the arrangement of the filter cassette properly in the vacuum cleaner appliance can be made quicker and easier.

The present invention provides a filter cassette for a vacuum cleaner appliance, wherein the filter cassette is positionable in the vacuum cleaner appliance such that the filter cassette is positionable in an airflow drawn in by the vacuum cleaner appliance, wherein the filter cassette contains substantially a lateral surface, an upper opening, and a lower opening, such that the drawn-in airflow, in order to filter out dirt particles, can flow into the filter cassette through the lower opening and out of the filter cassette through the upper opening.

According to the invention, at least one first and second sealing element are provided, wherein the first sealing element extends in a first plane and the second sealing element extends in a second plane, and wherein the first and second planes are arranged at an acute angle to one another, such that the second sealing element is oriented substantially horizontally when the filter cassette is positioned in a filter cassette receptacle of the vacuum cleaner appliance, wherein the filter cassette receptacle is accessible from outside the vacuum cleaner appliance. As a result, the arrangement of the filter cassette properly in the vacuum cleaner appliance can be made quicker and easier. Furthermore, optimal sealing off of the filter cassette in the drawn-in airflow can be ensured.

According to an advantageous embodiment of the present invention, it may be possible for the acute angle between the first and the second plane to have a value of 45°. As a result, a virtually optimal contact pressure on the first and second sealing elements can be generated.

According to an advantageous embodiment of the present invention, it may be possible for the filter cassette to be introducible into the filter cassette receptacle of the vacuum cleaner appliance at an acute angle, in particular 45°, in an insertion direction X in order to reach an end position, such that the first sealing element bears against a first contact surface of the filter cassette receptacle and the second sealing element bears against a second contact surface of the filter cassette receptacle.

The substantially wedge-like arrangement of the first and second sealing elements and the arrangement of the filter cassette at a flat angle in the filter cassette receptacle helps the filter cassette to be clamped in place in the filter cassette receptacle of the vacuum cleaner appliance on account of the dead weight of the filter cassette and thus to be positioned optimally in a sealed-off manner. The flat angle for the arrangement of the filter cassette in the filter cassette receptacle relates to a central axis of the filter cassette with respect to the horizontal.

The invention also provides a vacuum cleaner appliance having a filter cassette receptacle for receiving a filter cassette.

According to the invention, the filter cassette receptacle extends substantially in a center plane that is arranged at an acute angle, in particular 45°, to a parting plane.

BRIEF DESCRIPTION OF THE DRAWINGS

In the figures, identical and similar components are denoted by the same reference signs. In the figures.

DETAILED DESCRIPTION

Figure 1:
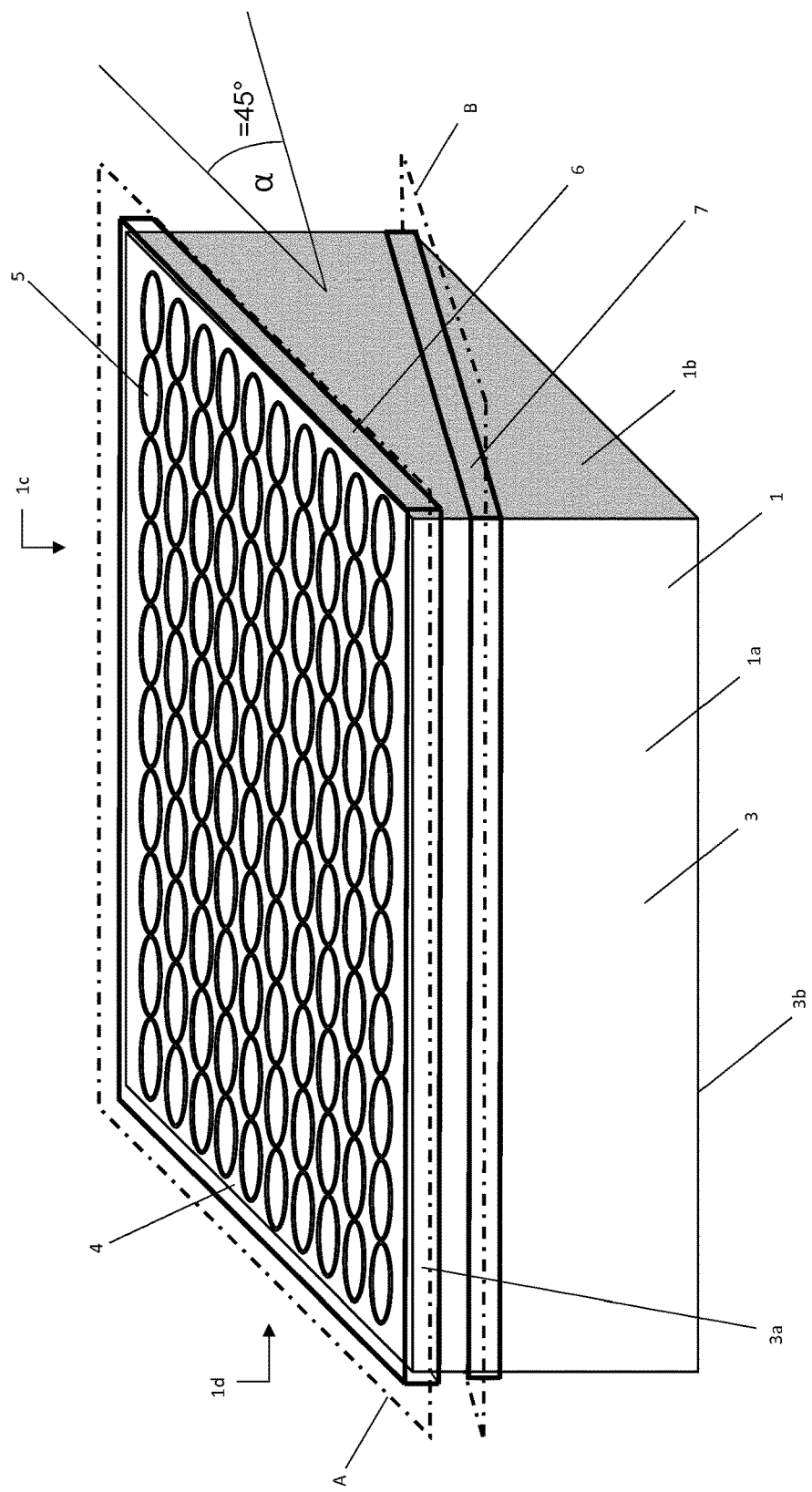
FIG. 1 shows a perspective view of a filter cassette according to the invention, having a first and a second sealing element.

FIG. 1 shows an illustration of an example of a filter cassette 1 according to the invention for a vacuum cleaner appliance 2.

The filter cassette 1 contains a first side wall 1a, second side wall 1b, third side wall 1c, and fourth side wall 1d. The first, second, third and fourth side walls 1a, 1b, 1c, 1d together form a lateral surface 3 encircling the filter cassette 1. The lateral surface 3 contains an upper side edge 3a and a lower side edge 3b. Both the upper and lower side edge 3a, 3b encircle the lateral surface 3. In the figures, the third and fourth side walls are not shown, only indicated.

Furthermore the lateral surface 3 encloses a cavity 4. The cavity 4 serves to receive and hold a filter element 5. The filter element 5 serves to filter out and retain dirt particles that are located in an airflow LS (See, e.g. FIG. 4) flowing through the filter element 5. The airflow LS is generated by the vacuum cleaner appliance 2, which will be described in detail below.

Furthermore, the filter cassette 1 contains a first sealing element 6 and a second sealing element 7. Both the first and the second sealing element 6, 7 are configured in the form of an elastic sealing band. The sealing band 6, 7 is produced from a rubber-like material. According to an alternative configuration, the first and second sealing elements 6, 7 can also have any other possible configuration.

The first sealing element 6 extends along the lateral surface 3 at the upper side edge 3a. Thus, the first sealing element 6 is located at an upper end of the filter cassette 1.

The second sealing element 7 extends along the first and third side walls 1a, 1c horizontally, or parallel to the first sealing element 6. The second sealing element 7 extends along the second and fourth side walls 1b, 1d at an acute angle α to a horizontal line. Acute angle α here is shown solely schematically but is 45 degrees in the exemplary embodiment as noted in FIG. 1. The second sealing element 7 is thus located in the vicinity of the upper side edge 3a of the filter cassette 1 along the first side wall 1a. The second sealing element 7 is located in the vicinity of the lower side edge 3b of the filter cassette along the third side wall 1c. At the second side wall 1b, the second sealing element 7 extends from top (from the vicinity of the upper side edge 3a) to bottom (into the vicinity of the lower side edge 3b). At the fourth side wall 1d, the second sealing element extends from bottom (from the vicinity of the lower side edge 3b) to top (into the vicinity of the upper side edge 3a). At the second and fourth side walls 1b, 1d, the first and second sealing elements 6, 7 form respective wedge-like surfaces between one another.

As illustrated in FIG. 1, the first sealing element 6 extends in a first plane A and the second sealing element 7 extends in a second plane B. The first and second planes A, B are arranged at an acute angle of 45° to one another, such that the second sealing element 7 is oriented substantially horizontally.

According to an alternative embodiment, the angle can also be greater than or smaller than 45°.

Figure 2:
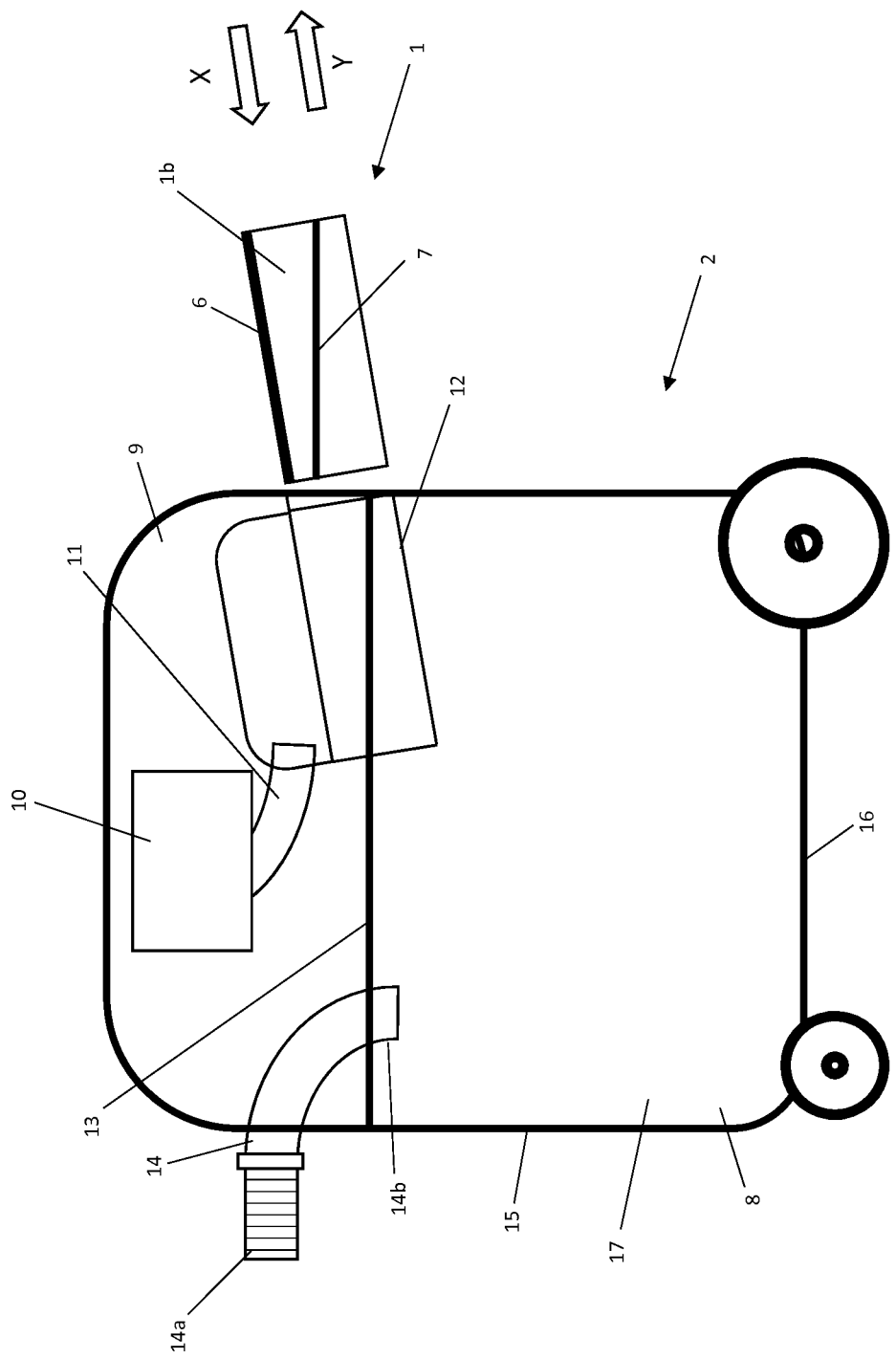
FIG. 2 shows a sectional side view of a vacuum cleaner appliance according to the invention having a collection container, a suction head, a filter cassette receptacle, and a filter cassette according to the invention, wherein the filter cassette is located outside the vacuum cleaner appliance.
Figure 3:
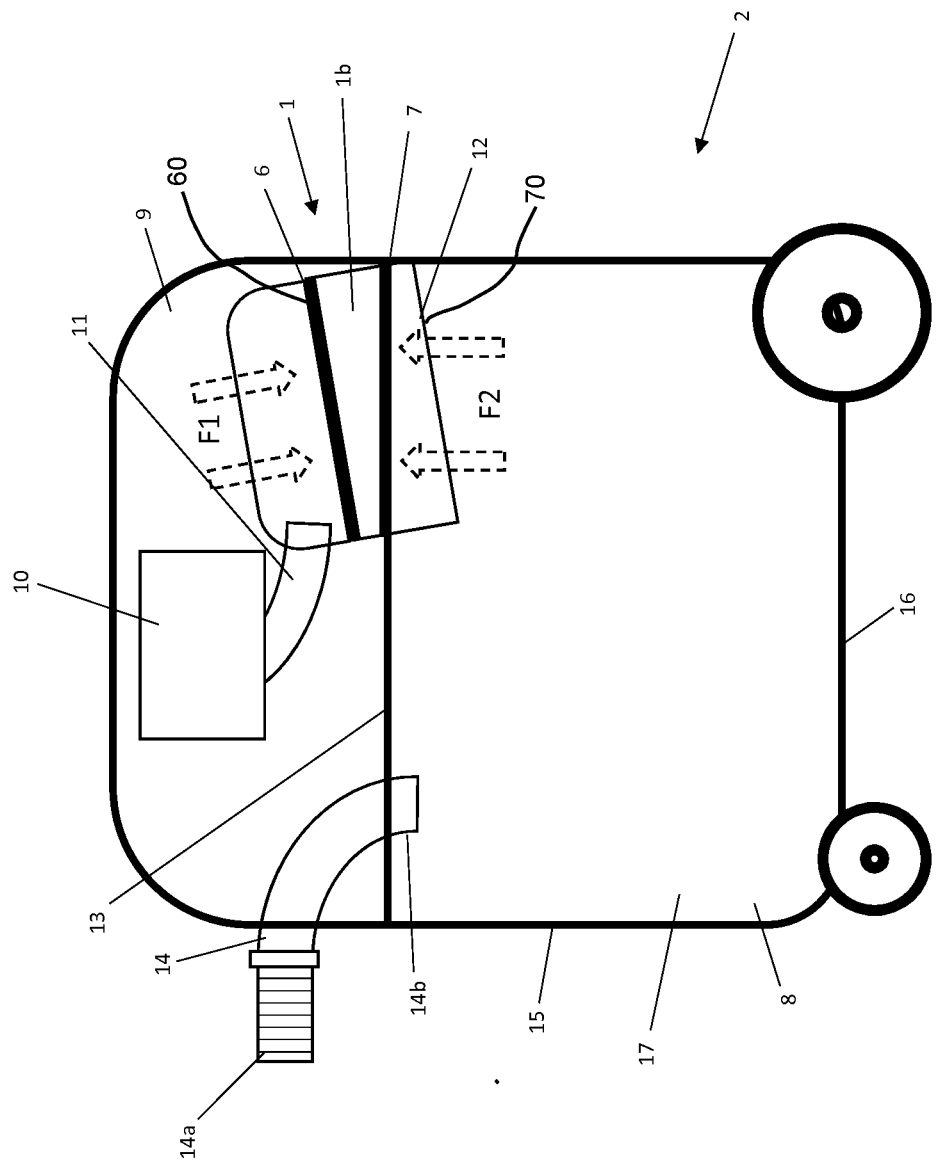
FIG. 3 shows a further sectional side view of the vacuum cleaner appliance according to the invention having the collection container, the suction head, the filter cassette receptacle, and the filter cassette according to the invention, wherein the filter cassette is located in the filter cassette receptacle.
Figure 4:
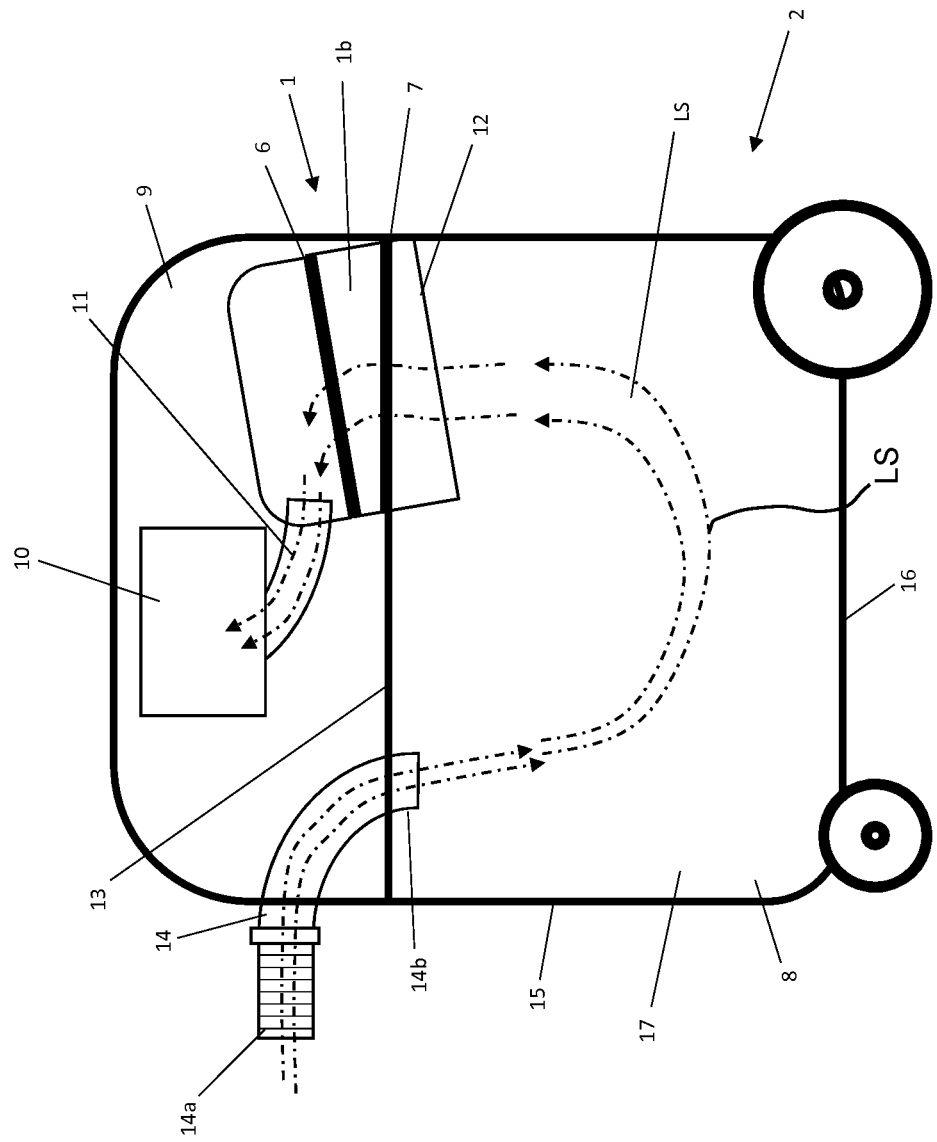
FIG. 4 shows a further sectional side view of the vacuum cleaner appliance according to the invention having the collection container, the suction head, the filter cassette receptacle, and the filter cassette according to the invention, wherein an airflow, drawn in by the vacuum cleaner appliance, through the filter cassette is indicated.

FIGS. 2 to 4 show the vacuum cleaner appliance 2. The vacuum cleaner appliance 2 contains substantially a collection container 8 and a suction head 9. The suction head 9 is positioned in a detachable manner on the collection container 8.

The suction head 9 contains a turbine 10 for generating a negative pressure. With the aid of the negative pressure, ambient air can be drawn into the interior of the vacuum cleaner appliance 2 from the outside. The turbine 10 is connected to a filter cassette receptacle 12 via a feeder pipe 11. The filter cassette receptacle 12 has substantially the shape and the external volume of the filter cassette 1 and serves to receive and hold the filter cassette 1. Furthermore, the filter cassette receptacle 12 is positioned between the suction head 9 and the collection container 8. A parting plane 13 extends between the suction head 9 and the collection container 8. Furthermore, the suction head 9 has an inlet pipe 14 with a first end 14a and a second end 14b. The first end 14a of the inlet pipe 14 is located outside the suction head 9 and serves to receive and hold a vacuum cleaner hose. The vacuum cleaner hose is not illustrated in the figures. The second end 14b of the inlet pipe 14 is directed toward the interior of the collection container 8. Through the second end 14b of the inlet pipe 14, the drawn-in air LS flows into the interior of the collection container 8.

The collection container 8 contains substantially an encircling wall surface 14 and a bottom 16. The encircling wall surface 14 and the bottom 16 form a cavity 17. The collection container 8 in turn serves to collect and retain dirt particles that are picked up with the aid of the drawn-in airflow LS. The dirt particles are not illustrated in the figures.

As indicated in FIG. 2, the filter cassette 1 can be introduced into the filter cassette receptacle 12 (in the direction X) through an opening. In order to remove the filter cassette 1 from the vacuum cleaner appliance 2, the filter cassette 1 is pulled out of the filter cassette receptacle 12 in the direction Y.

FIG. 2 shows the vacuum cleaner appliance 2 when the filter cassette 1 is located outside the filter cassette receptacle 12.

According to an alternative configuration, a locking mechanism can be provided at the opening of the filter cassette receptacle 12. The locking mechanism serves to lock or push the filter cassette 1 into the filter cassette receptacle 12.

FIG. 3 illustrates the vacuum cleaner appliance 2 when the filter cassette 1 is located inside the filter cassette receptacle 12.

When, as shown in FIGS. 3 and 4, the filter cassette 1 is positioned in the filter cassette receptacle 12 of the vacuum cleaner appliance 2, the filter cassette 1 is at an acute angle α of 45° in the filter cassette receptacle. In this end position, the first sealing element 6 bears against a first contact surface 60 of the filter cassette receptacle 12 and the second sealing element 7 bears against a second contact surface 70 of the filter cassette receptacle 12. The first contact pressure force F1 and the second contact pressure force F2 are accordingly applied to the first and second sealing elements 6, 7 of the filter cassette 1 for sealing off in an optimal and airtight manner. As a result of the inclined fit of the filter cassette 1 in the filter cassette receptacle 12, the contact pressure force F1 and the contact pressure force F2 act permanently on the first and second sealing elements 6, 7, thereby ensuring optimal sealing off of the filter cassette 1 in the drawn-in airflow LS.

OVERVIEW OF THE REFERENCE SIGNS

1 Filter cassette
1a First side wall 1a
1b Second side wall 1b

1c Third side wall 1c
1d Fourth side wall
2 Vacuum cleaner appliance
3 Lateral surface
3a Upper side edge
3b Lower side edge
4 Cavity of the filter cassette
5 Filter element
6 First sealing element
7 Second sealing element
8 Collection container
9 Suction head
10 Turbine
11 Feeder pipe
12 Filter cassette receptacle
13 Parting plane
14 Inlet pipe 14
14a First end of the inlet pipe 14
14b Second end of the inlet pipe 14
15 Encircling wall surface
16 Bottom
17 Cavity of the collection container
60 First contact surface
70 Second contact surface
F1 First contact pressure force
F2 Second contact pressure force
LS Drawn-in airflow

What is claimed is:

1. A filter cassette for a vacuum cleaner appliance, the filter cassette positionable in the vacuum cleaner appliance such that the filter cassette is positionable in an airflow drawn in by the vacuum cleaner appliance, the filter cassette comprising:
a lateral surface;
first and second side walls extending perpendicularly from the lateral surface;
an upper opening;
a lower opening, such that the drawn-in airflow, in order to filter out dirt particles, can flow into the filter cassette through the lower opening and out of the filter cassette through the upper opening;
at least one first and second seal element, wherein the first seal element extends in a first plane between the first and second side walls and the second seal element extends in a second plane between the first and second side walls, the first and second planes being arranged at an acute angle to one another, such that the second seal element is capable of being oriented substantially horizontally when the filter cassette is positioned in a filter cassette receptacle of the vacuum cleaner appliance, the filter cassette capable of being insertable and removable into the vacuum cleaner appliance from an outside; and
a filter element extending in the first plane;
wherein the second seal element has an end at the lateral surface between an upper side edge and a lower side edge of the lateral surface; wherein the end of the second seal element runs parallel to the upper side and lower side edge of the lateral surface; wherein the first seal element has a first seal element end at the upper side edge; and wherein the end of the second seal element is closer to the first seal element and the upper side edge than the lower side edge.

2. The filter cassette as recited in claim 1, wherein the acute angle between the first and the second plane has a value of 45°.

3. A vacuum cleaner appliance comprising:
a bottom defining a bottom plane coplanar or parallel to a bottom surface of the bottom; and
a filter cassette positioned in the vacuum cleaner appliance such that the filter cassette is positionable in an airflow drawn in by the vacuum cleaner appliance, the filter cassette including:
a lateral surface;
an upper opening;
a lower opening, such that the drawn-in airflow, in order to filter out dirt particles, can flow into the filter cassette through the lower opening and out of the filter cassette through the upper opening; and
at least one first and second seal element, the first seal element extending in a first plane and the second seal element extending in a second plane, the first and second planes being arranged at an acute angle to one another, such that the second seal element and the second plane are oriented substantially parallel to the bottom plane when the filter cassette is positioned in a filter cassette receptacle of the vacuum cleaner appliance, the filter cassette receptacle being accessible from outside the vacuum cleaner appliance;
the first seal element and the upper opening of the filter cassette being located on an upper side of the second plane and the lower opening of the filter cassette being located below the second plane.

4. The vacuum cleaner appliance as recited in claim 3 wherein the acute angle between the first and the second plane has a value of 45°.

5. The vacuum cleaner appliance as recited in claim 3 wherein the first plane is located in the filter cassette receptacle of the vacuum cleaner appliance at an acute angle to the bottom plane, such that the first seal element bears against a first contact surface of the filter cassette receptacle and the second seal element bears against a second contact surface of the filter cassette receptacle.

6. The vacuum cleaner appliance as recited in claim 3 wherein the filter cassette receptacle has two planar surfaces extending at an angle to the bottom plane and the second plane.

7. The vacuum cleaner appliance as recited in claim 3 wherein the second seal element has an end at the lateral surface between an upper side edge and a lower side edge of the lateral surface.

8. The vacuum cleaner appliance previously presented as recited in claim 7 wherein the end of the second seal element runs parallel to the upper side and lower side edge of the lateral surface.

9. The vacuum cleaner appliance previously presented as recited in claim 8 wherein the first seal element has a first seal element end at the upper side edge.

10. The vacuum cleaner appliance previously presented as recited in claim 9 wherein the end of the second seal element is closer to the first seal element and the upper side edge than the lower side edge.

11. The vacuum cleaner appliance as recited in claim 3 further comprising wheels at the bottom.

12. A method for introducing a filter cassette into a vacuum cleaner appliance, the method comprising:
positioning the filter cassette in the vacuum cleaner appliance such that the filter cassette is positionable in an airflow drawn in by the vacuum cleaner appliance, the filter cassette including: a lateral surface; first and second side walls extending perpendicularly from the lateral surface; an upper opening; a lower opening, such that the drawn-in airflow, in order to filter out dirt particles, can flow into the filter cassette through the lower opening and out of the filter cassette through the upper opening; and at least one first and second seal element, wherein the first seal element extends in a first plane between the first and second side walls and the second seal element extends in a second plane between the first and second side walls, the first and second planes being arranged at an acute angle to one another, the positioning including introducing the filter cassette into a filter cassette receptacle of the vacuum cleaner appliance in an insertion direction in order to reach an end position, such that the first seal element bears against a first contact surface of the filter cassette receptacle and the second seal element bears against a second contact surface of the filter cassette receptacle and the second plane is substantially parallel to a bottom plane of the vacuum cleaner appliance, the bottom plane is coplanar or parallel to a bottom surface of a bottom of the vacuum cleaner appliance, and the filter cassette when introduced has the upper opening on one side of the second plane and the lower opening on another side of the second plane when the second seal element is in the second plane.

13. A filter cassette for a vacuum cleaner appliance, the filter cassette positionable in the vacuum cleaner appliance such that the filter cassette is positionable in an airflow drawn in by the vacuum cleaner appliance, the filter cassette comprising:

a lateral surface;
first and second side walls extending perpendicularly from the lateral surface;
an upper opening;
a lower opening, such that the drawn-in airflow, in order to filter out dirt particles, can flow into the filter cassette through the lower opening and out of the filter cassette through the upper opening; and
at least one first and second seal element, wherein the first seal element extends in a first plane between the first and second side walls and the second seal element extends in a second plane between the first and second side walls, the first and second planes being arranged at an acute angle to one another, such that the second seal element is capable of being oriented substantially horizontally when the filter cassette is positioned in a filter cassette receptacle of the vacuum cleaner appliance, the filter cassette capable of being insertable and removable into the vacuum cleaner appliance from an outside;
wherein the second seal element has an end at the lateral surface between an upper side edge and a lower side edge of the lateral surface and wherein the end of the second seal element runs parallel to the upper side and lower side edge of the lateral surface, the upper and lower openings defining parallel planes on opposite sides of the second seal element, the second seal element extending at an angle to the parallel planes.

* * * * *